(12) United States Patent
Huang

(10) Patent No.: US 9,073,450 B2
(45) Date of Patent: Jul. 7, 2015

(54) CARRYING DEVICE FOR CARRYING ELECTRONIC DEVICE

(71) Applicant: GETAC TECHNOLOGY CORPORATION, Hsinchu County (TW)

(72) Inventor: Tzu-Chiu Huang, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 34 days.

(21) Appl. No.: 14/137,626

(22) Filed: Dec. 20, 2013

(65) Prior Publication Data

US 2015/0048231 A1    Feb. 19, 2015

Related U.S. Application Data

(60) Provisional application No. 61/866,151, filed on Aug. 15, 2013.

(51) Int. Cl.
*B60R 11/02* (2006.01)
*B60N 3/00* (2006.01)
*F16M 11/02* (2006.01)

(52) U.S. Cl.
CPC . *B60N 3/00* (2013.01); *B60R 11/02* (2013.01); *F16M 11/02* (2013.01); *B60R 11/0252* (2013.01)

(58) Field of Classification Search
CPC .............. G09G 3/3655; G09G 3/3614; G09G 2300/0876; G09G 2300/0426; G09G 2300/0443; G09G 2300/0447; G09G 2310/06; G09G 2320/0223; G09G 2320/028

See application file for complete search history.

(56) References Cited

U.S. PATENT DOCUMENTS

| | | | |
|---|---|---|---|
| 7,032,872 B2 * | 4/2006 | Sullivan | 248/346.07 |
| 7,385,807 B1 * | 6/2008 | Chuang | 361/679.01 |
| 7,866,623 B2 * | 1/2011 | Lampman et al. | 248/551 |
| 7,924,559 B2 * | 4/2011 | Kuo | 361/679.41 |
| 8,240,628 B2 * | 8/2012 | Huang | 248/316.1 |
| 2009/0213536 A1 * | 8/2009 | Lewandowski et al. | 361/679.43 |
| 2011/0141685 A1 * | 6/2011 | Hung et al. | 361/679.43 |

* cited by examiner

*Primary Examiner* — Jeanette E Chapman

(57) ABSTRACT

A carrying device for carrying an electronic device and a method thereof are provided. The carrying device includes a base, a movable positioning stand, a movable position-limiting block, and a linking unit. The linking unit connects to the movable positioning stand. The movable positioning stand and the linking unit are disposed in the base. The movable position-limiting block is disposed at the linking unit and in the base. When the electronic device is positioned on a carrying side of the base, it moves the movable positioning stand into the base, such that the movable positioning stand moves the linking unit into the base, and the linking unit moves the movable position-limiting block toward the carrying side. A first position-limiting portion of the movable position-limiting block protrudes from the carrying side and engages with the electronic device to thereby fix the electronic device to the carrying side of the base.

16 Claims, 9 Drawing Sheets

CARRYING DEVICE FOR CARRYING ELECTRONIC DEVICE

BACKGROUND OF THE INVENTION

1. Field of the Invention

The present invention relates to carrying devices and methods for use therewith, and more particularly, to a carrying device for carrying an electronic device and a method for use therewith.

2. Description of the Prior Art

Portable electronic devices, such as notebook computers and personal digital assistants (FDA), are not only characterized by high portability, but also characterized by high expandability typical of desktop computers to achieve various functions and effects by hardware-based expansion and software-based execution. In this regard, the commonest application is vehicle navigation carried out by a portable electronic device connected externally to a GPS receiving unit and adapted to operating in conjunction with an e-map and navigation software, so as to perform coordinate positioning, carry out navigation, and enable drivers to access nearby-map-related information and plan the best driving route for arriving at a destination as soon as possible. From the perspective of soldiers, police officers, and paramedics, the portable electronic device not only operates in conjunction with the GPS receiving unit to perform positioning and navigation but also gets connected to a command workstation through a wireless transceiver in order to exchange related information at any time and thus allow the command workstation to integrate resources, optimize command and deployment, and send deployment instructions to first-line workers by the portable electronic device.

As far as vehicular portable electronic devices are concerned, when in use on a vehicle, a portable electronic device is not only operable by a passenger but also rechargeable by a vehicular power supply and connectable to another vehicular electronic instrument. For reasons related to the drive and the road, the vehicle jolts and shakes while moving; hence, the portable electronic device has to be positioned on and fixed firmly to a fixing stand to avoid being hit and damaged or prevent disconnection of an interface terminal from failing to connect with another electronic instrument.

In view of the aforesaid problems, the present invention provides a carrying device for carrying an electronic device and a method for use therewith, wherein the carrying device fixes the electronic device firmly in place to prevent disconnection of the electronic device from the carrying device while the vehicle is jolting and shaking or in other situations.

SUMMARY OF THE INVENTION

It is an objective of the present invention to provide a carrying device for carrying an electronic device and a method for use therewith, wherein the carrying device carries an electronic device and fixes the electronic device firmly in place to avoid disconnection of the electronic device because of jolting or in other situations.

In order to achieve the above and other objectives, the present invention provides a carrying device for carrying an electronic device. The carrying device comprises: a base having a carrying side carrying an electronic device; a movable positioning stand with an end disposed in the base and another end protruding from the base, the movable positioning stand being movable into the base; a movable position-limiting block disposed in the base and having at least a first position-limiting portion; and a linking unit with an end connected to the movable positioning stand, wherein the movable position-limiting block is disposed at the linking unit, and when the movable positioning stand moves into the base, the movable positioning stand drives the linking unit to move into the base, and the linking unit drives the movable position-limiting block to move toward the carrying side, such that the first position-limiting portion protrudes from the carrying side, thereby fixing the electronic device to the carrying side.

A carrying device for carrying an electronic device and a method for carrying the electronic device are provided. The method comprises the steps of: positioning an electronic device on a carrying side of a base of a carrying device; moving a movable positioning stand of the carrying device in a manner to drive the movable positioning stand to move into the base; and driven by the movable positioning stand a linking unit of the carrying device moves into the base, driven by the linking unit the movable position-limiting block moves toward the carrying side, positioning at least a first position-limiting portion of the movable position-limiting block at at least a first fixing portion of the electronic device, thereby fixing the electronic device to the carrying side.

DETAILED DESCRIPTION OF THE EMBODIMENTS

The features and achieved advantages of the present invention are hereunder illustrated with specific embodiments in conjunction with the accompanying drawings, A conventional portable electronic device is positioned at an object (such as a vehicle) by means of a carrying device. The carrying device carries the portable electronic device and fixes the portable electronic device firmly in place to prevent the portable electronic device from separating from the carrying device when jolted or shaken. Hence, the present invention provides a carrying device for carrying an electronic device and a method for use therewith. The carrying device is fixed firmly to the electronic device to thereby prevent the electronic device from separating from the carrying device because of jolting.

Figure 1:
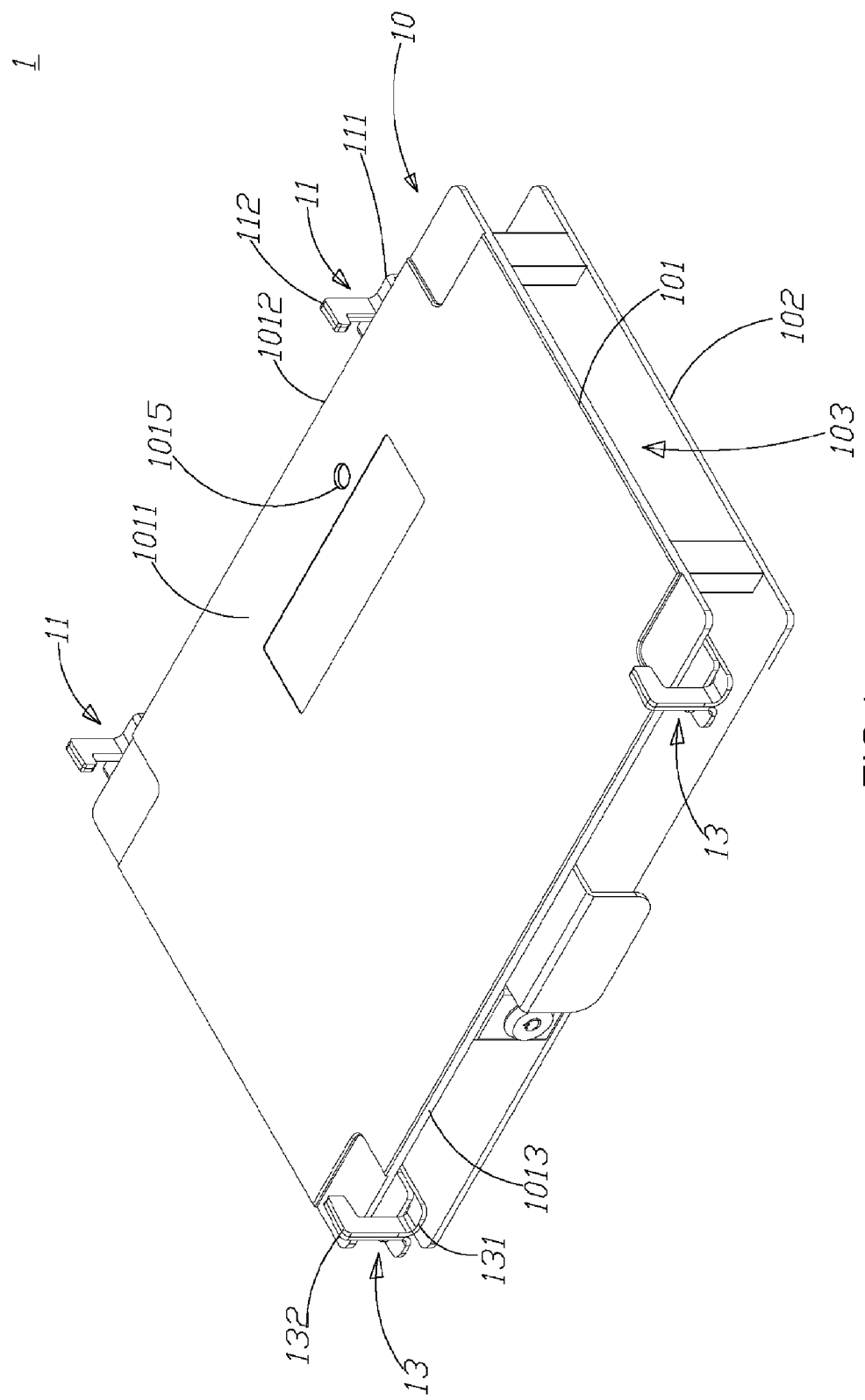
FIG. 1 is a perspective view of a carrying device according to the first embodiment of the present invention.
Figure 2:
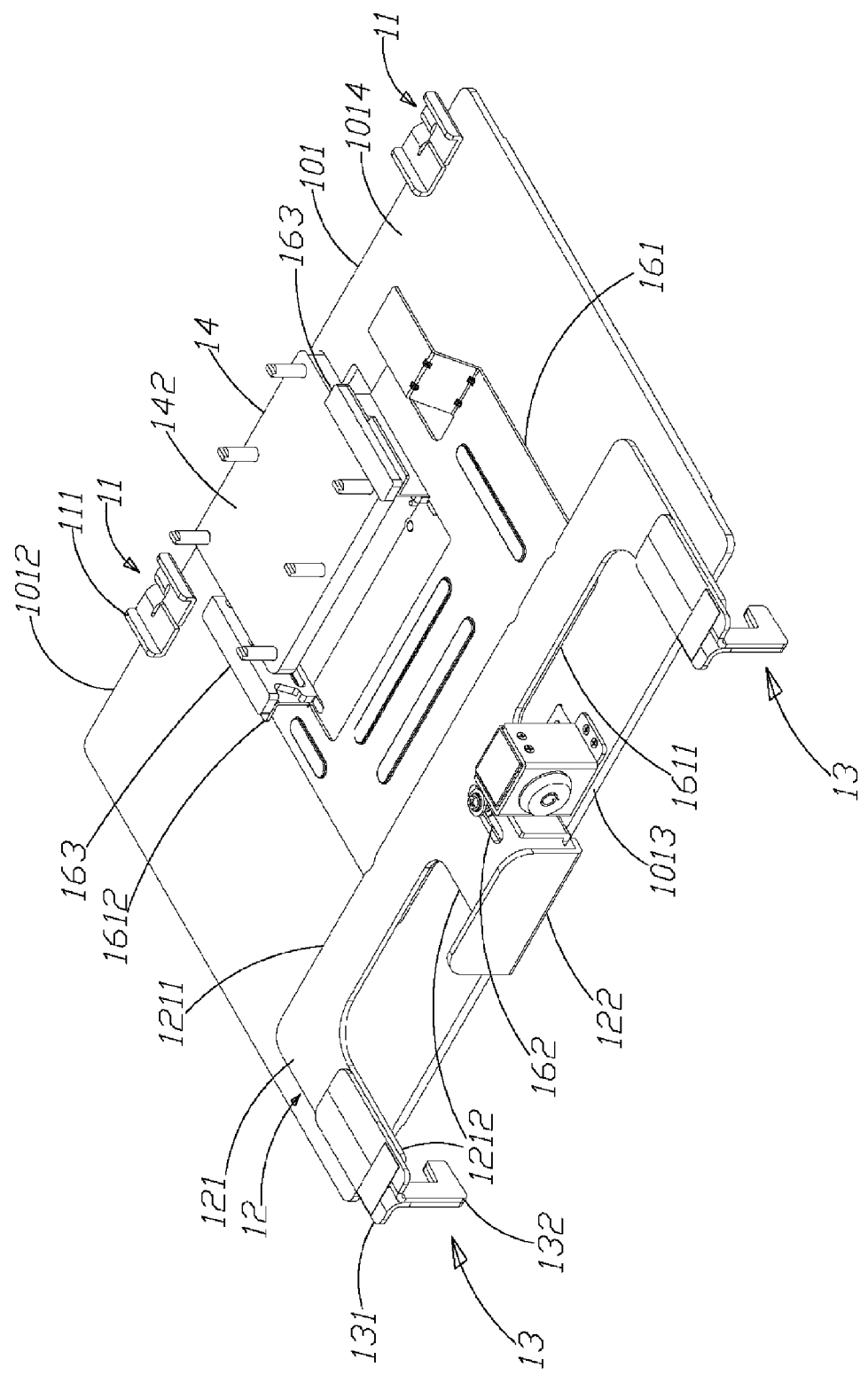
FIG. 2 is a schematic view of a first casing according to the first embodiment of the present invention.

Referring to FIG. 1 and FIG. 2, which are a perspective view of a carrying device and a schematic view of a first casing according to the first embodiment of the present invention. As shown in the figures, in this embodiment, the present invention provides a carrying device 1 for carrying an electronic device. The carrying device 1 comprises a base 10, a movable positioning stand 12, a movable position-limiting block 14, and a linking unit 16. The base 10 has a first casing 101 and a second casing 102. The first casing 101 is disposed above the second casing 102. A receiving space 103 is defined by and between the first casing 101 and the second casing 102. The external surface of the first casing 101 is defined as a carrying side 1011. The carrying side 1011 is configured to carry an electronic device (such as a notebook computer or any other portable electronic device.) The first casing 101 has a first lateral edge 1012 and a second lateral edge 1013 is opposite to the first lateral edge 1012. At least a first positioning element 11 is disposed at the first lateral edge 1012. In this embodiment, the carrying device 1 has two first positioning elements 11, but the first positioning elements 11 each protrudes from the carrying side 1011. In this embodiment, the first positioning elements 11 each comprises a first connecting stand 111 and a first positioning hook 112. The first positioning hook 112 is disposed at the first connecting stand 111. When the first positioning elements 11 is disposed at the first lateral edge 1012 of the first casing 101, the first connecting stand 111 of the first positioning elements 11 is fixed to an inner surface 1014 of the first casing 101. The inner surface 1014 is opposite to the carrying side 1011. The first positioning hook 112 is movable along the first lateral edge 1012 of the first casing 101 and protrudes from the carrying side 1011. The first positioning hook 112 moves in the direction of the carrying side 1011.

Figure 3:
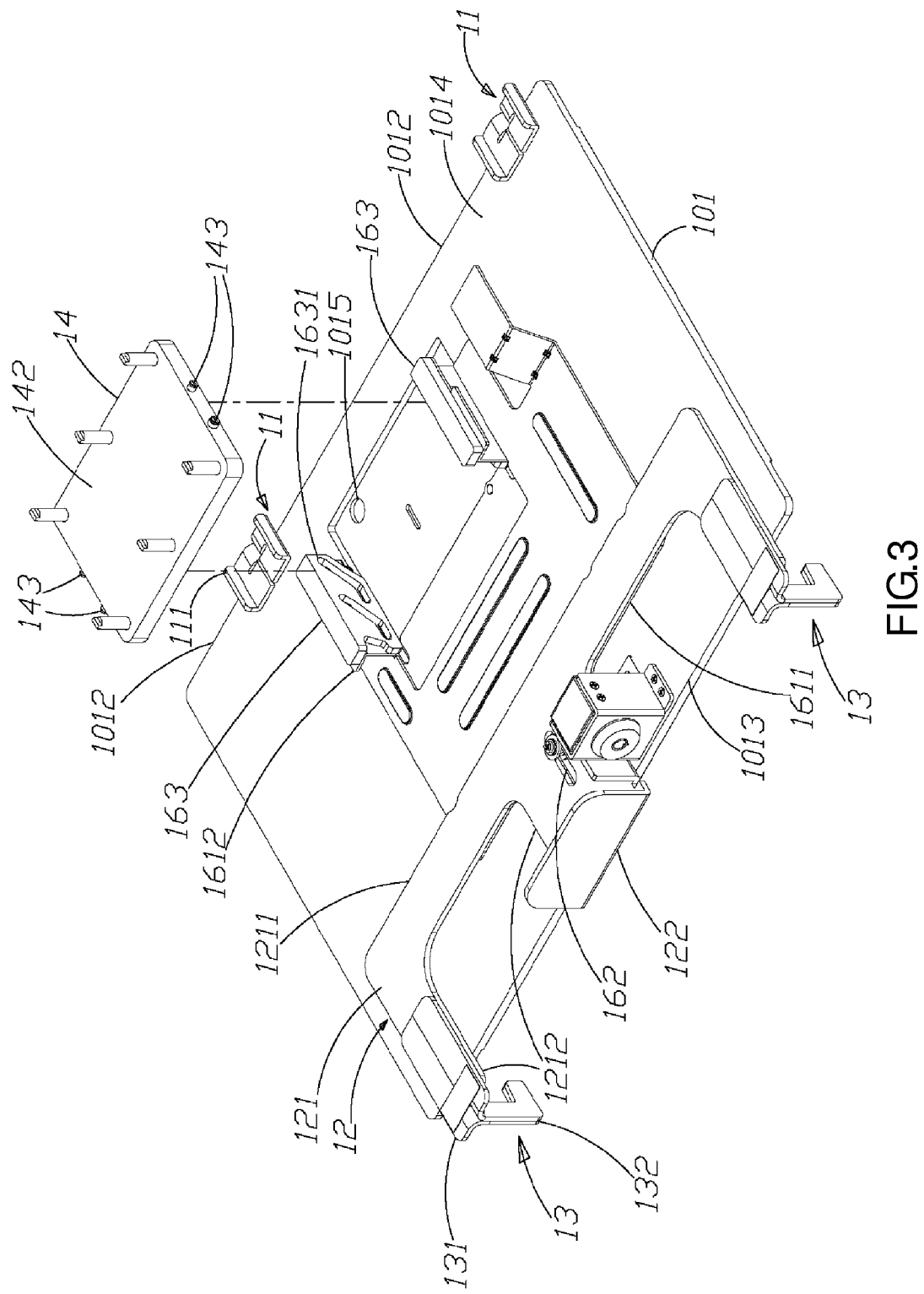
FIG. 3 is a schematic view of how to assemble the carrying device according to the first embodiment of the present invention.
Figure 5A:
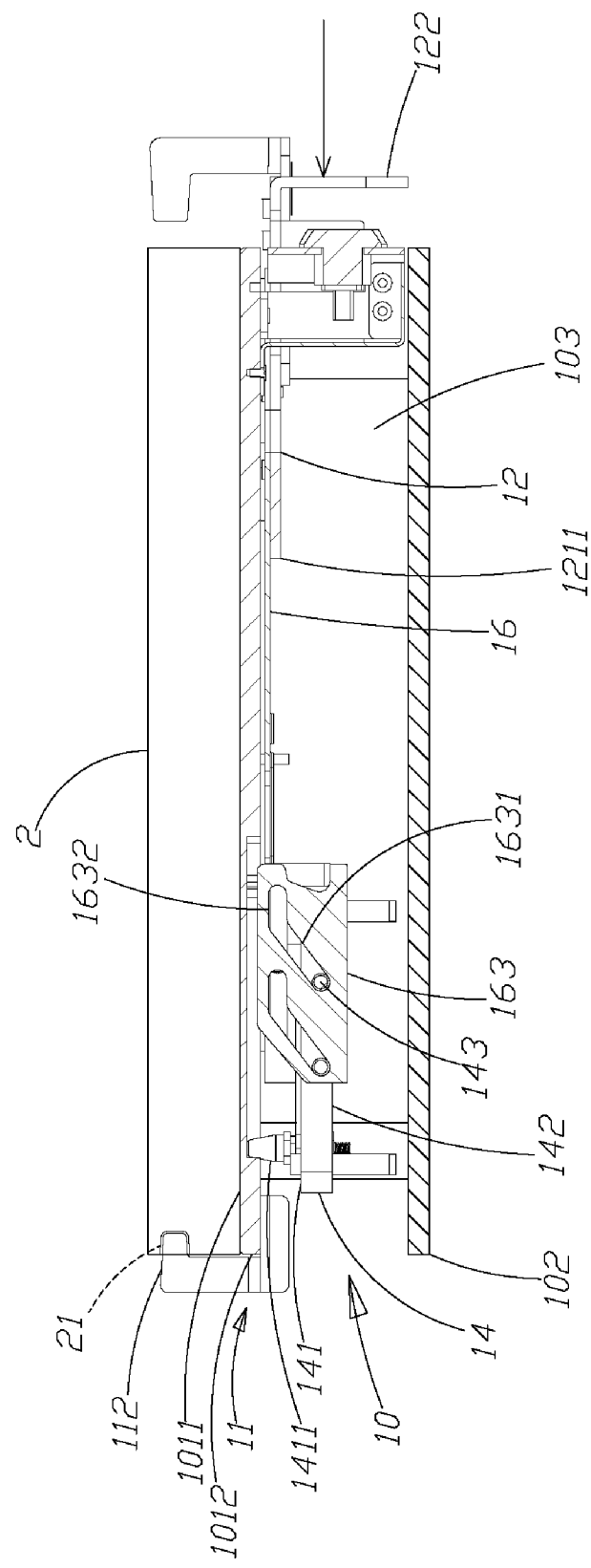
FIG. 5A through FIG. 5C are schematic views of the state of how to operate the carrying device according to the first embodiment of the present invention.

Referring to FIG. 3, which is a schematic view of how to assemble the carrying device according to the first embodiment of the present invention. As shown in the diagram, the movable positioning stand 12 is disposed on the inner surface 1014 of the first casing 101 of the base 10 and comprises a positioning body 121 and a driving portion 122. The positioning body 121 has a first end 1211 and a second end 1212. The positioning body 121 is disposed on the inner surface 1014 of the first casing 101. The first end 1211 of the positioning body 121 is disposed in the receiving space 103 of the base 10 (as shown in FIG. 5A.) The second end 1212 of the positioning body 121 protrudes from a second lateral edge 1013 of the first casing 101. The driving portion 122 is disposed at the second end 1212 of the positioning body 121. In this embodiment, the driving portion 122 is a handle, and a user pushes the driving portion 122 such that the driving portion 122 drives the positioning body 121 to move along the inner surface 1014 of the first casing 101. In this embodiment, the movable positioning stand 12 further has at least a second positioning element 13. In this embodiment, the carrying device 1 further comprises two second positioning elements 13. The two second positioning elements 13 are disposed at the second end 1212 of the positioning body 121 of the movable positioning stand 12 and opposite to the two first positioning elements 11 of the first lateral edge 1012 of the base 10, respectively. The driving portion 122 is disposed between the two second positioning elements 13. In this embodiment, each of the second positioning elements 13 comprises a second connecting stand 131 and a second positioning hook 132. The second positioning hook 132 is disposed at the second connecting stand 131, and the second connecting stand 131 is disposed at the second end 1212 of the positioning body 121. The second positioning hook 132 protrudes from the carrying side 1011 of the first casing 101. The second positioning hook 132 moves in the direction of the carrying side 1011, as shown in FIG. 1, and is opposite to the first positioning hook 112 of the first positioning elements 11.

Figure 4:
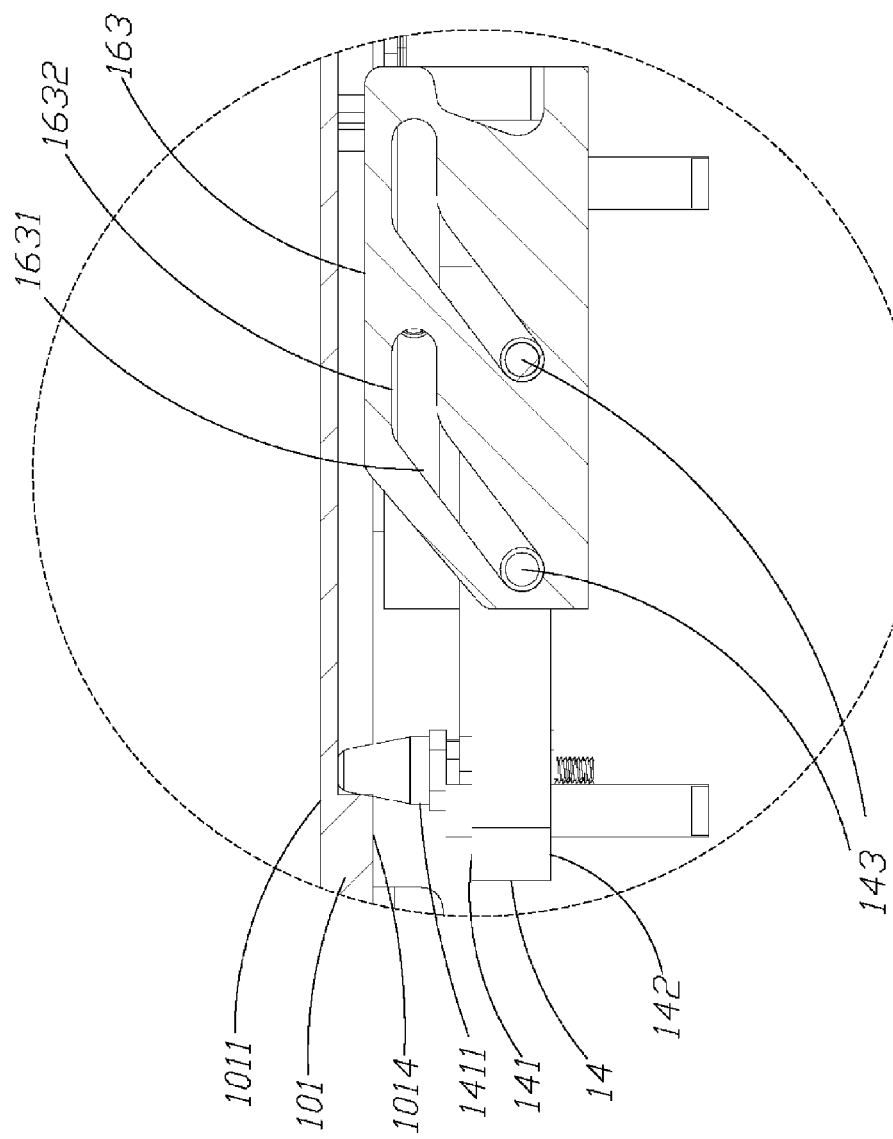
FIG. 4 is a schematic view of a movable position-limiting block and a linking unit coupled together according to the first embodiment of the present invention.

The movable position-limiting block 14 is disposed in the receiving space 103 between the first casing 101 and the second casing 102. That is, the movable position-limiting block 14 is inside the base 10. The movable position-limiting block 14 has a first surface 141 (as shown in FIG. 4) and a second surface 142 is opposite to the first surface 141. The first surface 141 faces the first casing 101, and the second surface 142 faces the second casing 102 (as shown in FIG. 5A.) The first surface 141 has a first position-limiting portion 1411 (as shown in FIG. 4.) The first position-limiting portion 1411 is a convex post, and thus the first casing 101 has a position-limiting hole 1015. The position-limiting hole 1015 penetrates the carrying side 1011 and the inner surface 1014 of the first casing 101 (as shown in FIG. 1 and FIG. 4) and corresponds to the first position-limiting portion 1411. The movable position-limiting block 14 is disposed in the receiving space 103 of the base 10 by means of the linking unit 16 (as shown in FIG. 5A.)

The linking unit 16 is disposed on the inner surface 1014 of the first casing 101 of the base 10 and connected to the movable positioning stand 12. The movable position-limiting block 14 is disposed on the linking unit 16. In this embodiment, the linking unit 16 comprises a linking body 161, at least a connecting portion 162 and at least two linking portions 163. The linking body 161 has a first end 1611 and a second end 1612. The at least a connecting portion 162 is disposed at the first end 1611. The at least two linking portions 163 are disposed at the second end 1612 and opposite to each other. The linking body 161 is disposed on the inner surface 1014 of the first casing 101. That is, the linking body 161 is inside the base 10. The at least a connecting portion 162 of the linking unit 161 is connected to the first end 1211 of the positioning body 121 of the movable positioning stand 12. The movable position-limiting block 14 is pivotally connected to the at least two linking portions 163 disposed at the second end 1612 of the linking body 161. Referring to FIG. 3 and FIG. 4, in this embodiment, each of the at least two linking portions 163 has at least a rail 1631 respectively. The at least a rail 1631 extends in a direction oblique to the carrying side 1011 of the base 10. An end of the at least a rail 1631, which is positioned distal to the carrying side 1011 of the base 10, is positioned proximate to the first lateral edge 1012 of the base 10. At least a guiding portion 143 corresponding in position to the at least a rail 1631 of the at least linking portions 163 is disposed on each of the two sides of the movable position-limiting block 14. The at least a guiding portion 143 is disposed at the at least a rail 1631, wherein the end of the at least a rail 1631 is positioned distal to the carrying side 1011 of the base 10.

Figure 5B:
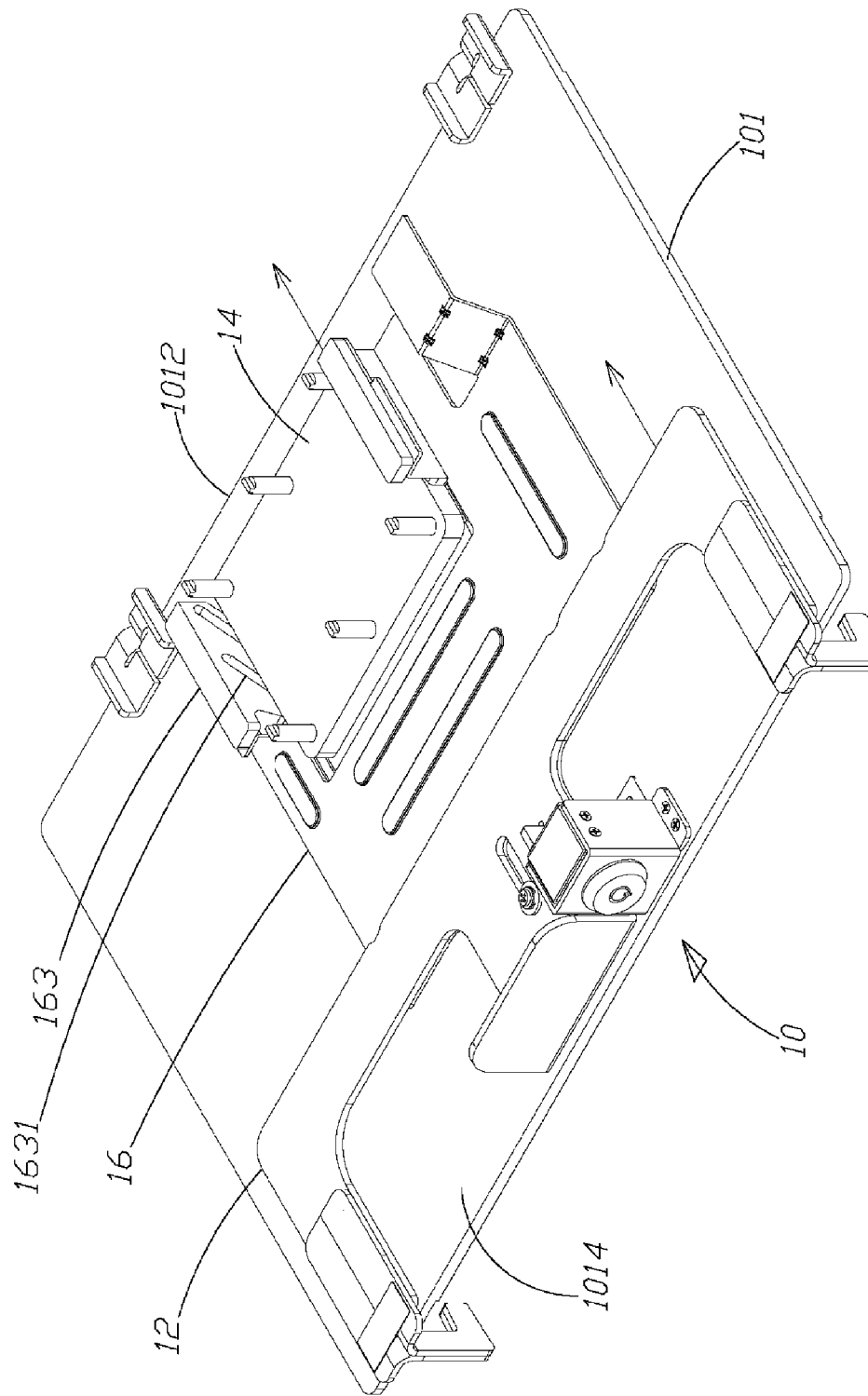
Figure 5C:
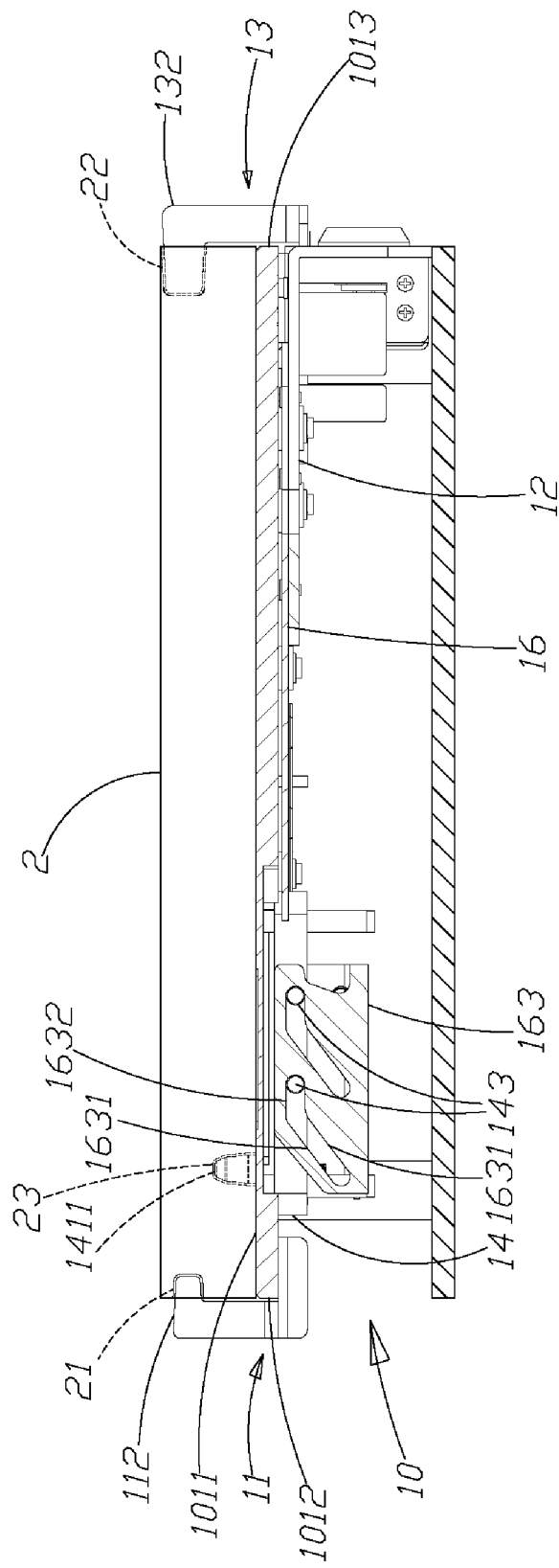

Referring to FIG. 5A through FIG. 5C, which are schematic views of how to operate the carrying device according to the first embodiment of the present invention. As shown in the diagrams, when an electronic device 2 is positioned on the carrying side 1011 of the base 10, the first positioning hook 112 of the first positioning element 11 at the first lateral edge 1012 of the base 10 is engaged with a first positioning portion 21 of the lateral edge of the electronic device 2, wherein the first positioning portion 21 is positioned proximate to the first lateral edge 1012, thereby positioning the electronic device 2 on the carrying side 1011 of the base 10 preliminarily. Afterward, the user exerts a force upon the driving portion 122 of the movable positioning stand 12 and moves the movable positioning stand 12 along the inner surface 1014 of the first casing 101 of the base 10 and toward the first lateral edge 1012 of the base 10 linearly; that is, moving the movable positioning stand 12 into the base 10, such that the movable positioning stand 12 drives the linking unit 16 to move toward the first lateral edge 1012 of the base 10 (i.e., into the base 10). Meanwhile, the two guiding portions 143 of the movable position-limiting block 14 move along two said rails 1631 of the at least two linking portions 163 and toward the carrying side 1011 of the base 10 to thereby drive the movable position-limiting block 14 to move toward the carrying side 1011 of the base 10.

As soon as the movable positioning stand 12 moves into the base 10, the two second positioning hooks 132 of the two second positioning elements 13 disposed at the movable positioning stand 12 approach the second lateral edge 1013 of the base 10 and engage with two second positioning portions 22 at the lateral edge of the electronic device 2 which is adjacent to the second lateral edge 1013 of the base 10, such that two first positioning elements 11 together fix the electronic device 2 to the carrying side 1011 of the base 10; meanwhile, the first position-limiting portion 1411 of the movable position-limiting block 14 protrudes from the position-limiting hole 1015 of the carrying side 1011 (as shown in FIG. 1) and engages with a first fixing portion 23 of the electronic device 2 to thereby fix the electronic device 2 to the carrying side 1011 of the base 10, such that the electronic device 2 is fixed firmly to the carrying side 1011 of the base 10.

Again, referring to FIG. 5C, an end of the rail 1631, which is positioned proximate to the first casing 101, further connects to a slot 1632. The slot 1632 extends horizontally in the direction of the second lateral edge 1013 of the first casing 101 on which the movable positioning stand 12 is disposed. As soon as the linking unit 16 drives the movable position-limiting block 14 to move toward the first lateral edge 1012 of the base 10, the two guiding portions 143 of the movable position-limiting block 14 move along the rails 1631 of the at least two linking portions 163, respectively, thereby causing the movable position-limiting block 14 to move toward the carrying side 1011 of the base 10. Finally, the two guiding portions 143 of the movable position-limiting block 14 engage with the corresponding slots 1632 of the linking portions 163, respectively, to prevent the movable position-limiting block 14 from being subjected to any external force and thus restore the two guiding portions 143 on the two sides of the movable position-limiting block 14 to their initial positions (i.e., causing the two guiding portions 143 to return to an end of the rail 1631 which is positioned distal to the first casing 101), thereby allowing the electronic device 2 to be fixed to the carrying device 1 more firmly.

Figure 6:
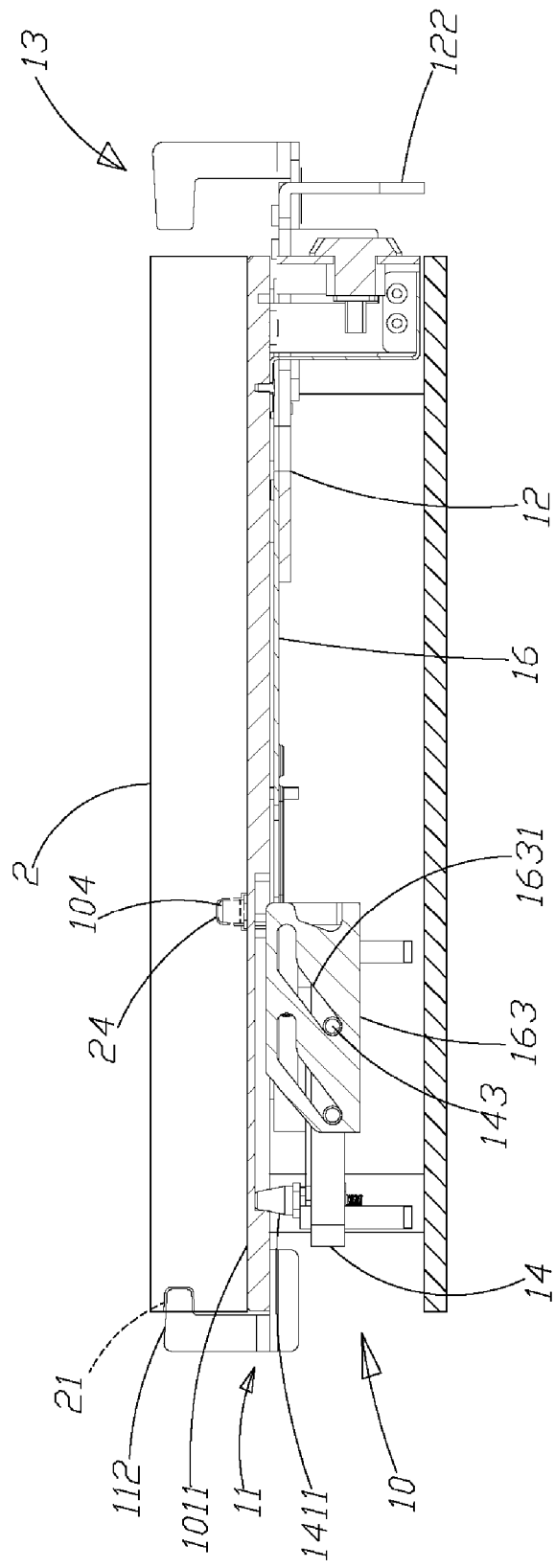
FIG. 6 is a schematic view of the state of how to operate the carrying device according to the second embodiment of the present invention.

Referring to FIG. 6, which is a schematic view of how to operate the carrying device according to the second embodiment of the present invention. As shown in the diagram, a second position-limiting portion 104 is disposed on the carrying side 1011 of the base 10. In this embodiment, the second position-limiting portion 104 is a convex post, when the electronic device 2 is initially disposed on the carrying side 1011 (that is, before the electronic device 2 is fixed in place by means of the two second positioning elements 13), two first positioning elements 11 of the base 10 are disposed at two first positioning portions 21 of the electronic device 2, respectively, whereas the second position-limiting portion 104 engages with a second fixing portion 24 disposed at the electronic device 2 to preliminarily position the electronic device 2 on the carrying side 1011 of the base 10.

Figure 7:
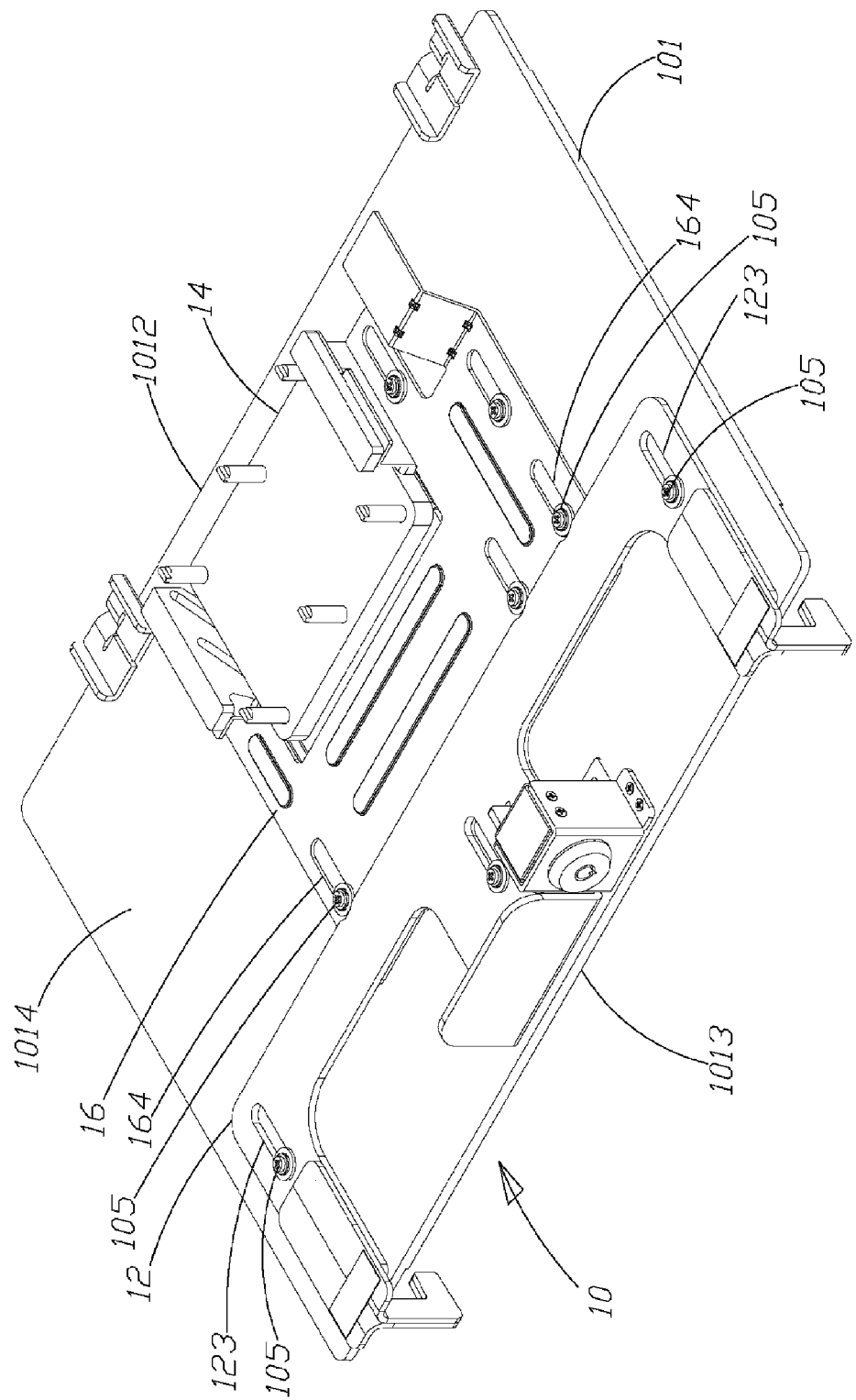
FIG. 7 is a schematic view of the first casing according to the third embodiment of the present invention.

Referring to FIG. 7, which is a schematic view of the first casing according to the third embodiment of the present invention. As shown in the diagram, in order to allow the movable positioning stand 12 and linking unit 16 to move linearly into the base 10, the positioning body 121 of the movable positioning stand 12 and the linking body 161 of the linking unit 16 have at least a first guiding portion 123, 164, respectively. In this embodiment, the first guiding portions 123, 164 are linear grooves. The first guiding portions 123, 164 extend in a direction parallel to an axis of the base 10. The axis of the base 10 is defined as the line which connects the midpoint of the first lateral edge 1012 and the midpoint of the second lateral edge 1013. The first guiding portions 123, 164 are disposed at a plurality of second guiding portions 105 of the inner surface 1014 of the first casing 101 of the base 10, respectively. In this embodiment, the second guiding portions 105 are convex posts, and thus the first guiding portions 123, 164 move along the second guiding portions 105 linearly, such that the movable positioning stand 12 drives the linking unit 16 to move linearly along the inner surface 1014 of the first casing 101 of the base 10. In this embodiment, the first guiding portions 123, 164 may be convex posts, and the second guiding portions 105 are linear grooves, which are not described herein in detail for the sake of brevity.

In conclusion, the present invention provides a carrying device for carrying an electronic device and a method for use therewith. The carrying device carries an electronic device and fixes the electronic device firmly in place to prevent the electronic device from separating from the carrying device when jolted or in other situations.

The present invention is disclosed above by preferred embodiments. However, persons skilled in the art should understand that the preferred embodiments are illustrative of the present invention only, and should not be interpreted as restrictive of the scope of the present invention. Hence, all equivalent changes and modifications made to the aforesaid embodiments of the present invention in accordance with the spirit, features, structures, and shapes recited in the claims of the present invention should fall within the claims of the present invention.

What is claimed is:

1. A carrying device for carrying an electronic device, the carrying device comprising:
   a base having a carrying side carrying an electronic device;
   a movable positioning stand with an end disposed in the base and another end protruding from the base, the movable positioning stand being movable into the base;
   a movable position-limiting block disposed in the base and having at least a first position-limiting portion; and
   a linking unit with an end connected to the movable positioning stand, wherein the movable position-limiting block is disposed at the linking unit, and when the movable positioning stand moves into the base, the movable positioning stand drives the linking unit to move into the base, and the linking unit drives the movable position-limiting block to move toward the carrying side, such that the first position-limiting portion protrudes from the carrying side, thereby fixing the electronic device to the carrying side;
   at least a first positioning element disposed at the base; and
   at least a second positioning element disposed at the movable positioning stand and opposite to the first positioning element, wherein the first positioning element and the second positioning element fix the electronic device to the carrying side, and wherein the first positioning element and the second positioning element protrude from the carrying side.

2. The carrying device for carrying an electronic device of claim 1, wherein the first positioning element and the second positioning element are disposed at at least a first positioning portion and at least a second positioning portion of the electronic device, respectively.

3. A method for carrying an electronic device using the carrying device of claim 1, the method comprising the steps of:
   positioning the electronic device on the carrying side of the base of the carrying device;

moving the movable positioning stand of the carrying device in a manner to drive the movable positioning stand to move into the base; and driven by the movable positioning stand, the linking unit of the carrying device moving into the base;

driven by the linking unit, the movable position-limiting block moving toward the carrying side, positioning at least the first position-limiting portion of the movable position-limiting block at at least the first fixing portion of the electronic device, thereby fixing the electronic device to the carrying side.

4. The carrying device for carrying an electronic device of claim 1, wherein the linking unit comprises:
a linking body disposed in the base and having an end connected to the movable positioning stand; and
at least two linking portions disposed at another end of the linking body and pivotally connected to at least two guiding portions of the movable position-limiting block, respectively, so as for the linking unit to drive the movable position-limiting block to move toward the carrying side.

5. carrying device for carrying an electronic device of claim 4, wherein the linking portions each has at least a rail extending in a direction oblique to the carrying side of the base.

6. The carrying device for carrying an electronic device of claim 5, wherein the linking portions each has a slot connecting to an end of the rail which is positioned proximate to the carrying side and extending horizontally toward an end of the base at which the movable positioning stand is disposed.

7. The carrying device for carrying an electronic device of claim 1, wherein the linking unit and the movable positioning stand each has at least a first guiding portion, and the base has a plurality of second guiding portions, wherein the first guiding portions are disposed at the corresponding second guiding portions, respectively, such that the movable positioning stand and the linking unit move along the base linearly.

8. A carrying device for carrying an electronic device, the carrying device comprising:
a base having a carrying side carrying an electronic device;
a movable positioning stand with an end disposed in the base and another end protruding from the base, the movable positioning stand being movable into the base;
a movable position-limiting block disposed in the base and having at least a first position-limiting portion;
a linking unit with an end connected to the movable positioning stand, wherein the movable position-limiting block is disposed at the linking unit, and when the movable positioning stand moves into the base, the movable positioning stand drives the linking unit to move into the base, and the linking unit drives the movable position-limiting block to move toward the carrying side, such that the first position-limiting portion protrudes from the carrying side, thereby fixing the electronic device to the carrying side, and wherein the first position-limiting portion engages with a first fixing portion of the electronic device when fixing the electronic device to the carrying side; and
a second position-limiting portion disposed on the carrying side and engaged with a second fixing portion of the electronic device.

9. The carrying device for carrying an electronic device of claim 8, wherein the linking unit comprises:
a linking body disposed in the base and having an end connected to the movable positioning stand; and
at least two linking portions disposed at another end of the linking body and pivotally connected to at least two guiding portions of the movable position-limiting block, respectively, so as for the linking unit to drive the movable position-limiting block to move toward the carrying side.

10. carrying device for carrying an electronic device of claim 9, wherein the linking portions each has at least a rail extending in a direction oblique to the carrying side of the base.

11. The carrying device for carrying an electronic device of claim 10, wherein the linking portions each has a slot connecting to an end of the rail which is positioned proximate to the carrying side and extending horizontally toward an end of the base at which the movable positioning stand is disposed.

12. The carrying device for carrying an electronic device of claim 8, wherein the linking unit and the movable positioning stand each has at least a first guiding portion, and the base has a plurality of second guiding portions, wherein the first guiding portions are disposed at the corresponding second guiding portions, respectively, such that the movable positioning stand and the linking unit move along the base linearly.

13. A carrying device for carrying an electronic device, the carrying device comprising:
a base having a carrying side carrying an electronic device;
a movable positioning stand with an end disposed in the base and another end protruding from the base, the movable positioning stand being movable into the base;
a movable position-limiting block disposed in the base and having at least a first position-limiting portion; and
a linking unit with an end connected to the movable positioning stand, wherein the movable position-limiting block is disposed at the linking unit, and when the movable positioning stand moves into the base, the movable positioning stand drives the linking unit to move into the base, and the linking unit drives the movable position-limiting block to move toward the carrying side, such that the first position-limiting portion protrudes from the carrying side, thereby fixing the electronic device to the carrying side;
wherein the linking unit comprises:
a linking body disposed in the base and having an end connected to the movable positioning stand; and
at least two linking portions disposed at another end of the linking body and pivotally connected to at least two guiding portions of the movable position-limiting block, respectively, so as for the linking unit to drive the movable position-limiting block to move toward the carrying side.

14. The carrying device for carrying an electronic device of claim 13, wherein the linking portions each has at least a rail extending in a direction oblique to the carrying side of the base.

15. The carrying device for carrying an electronic device of claim 14, wherein the linking portions each has a slot connecting to an end of the rail which is positioned proximate to the carrying side and extending horizontally toward an end of the base at which the movable positioning stand is disposed.

16. The carrying device for carrying an electronic device of claim 13, wherein the linking unit and the movable positioning stand each has at least a first guiding portion, and the base has a plurality of second guiding portions, wherein the first guiding portions are disposed at the corresponding second guiding portions, respectively, such that the movable positioning stand and the linking unit move along the base linearly.

* * * * *